(12) United States Patent
Yang et al.

(10) Patent No.: US 10,482,865 B2
(45) Date of Patent: Nov. 19, 2019

(54) VIBRATION DAMPED SOUND SHIELD

(71) Applicant: THE HONG KONG UNIVERSITY OF SCIENCE AND TECHNOLOGY, Hong Kong (CN)

(72) Inventors: Zhiyu Yang, Hong Kong (CN); Ping Sheng, Hong Kong (CN); Min Yang, Hong Kong (CN); Liang Sun, Hong Kong (CN); Guancong Ma, Hong Kong (CN)

(73) Assignee: THE HONG KONG UNIVERSITY OF SCIENCE AND TECHNOLOGY, Hong Kong (CN)

( * ) Notice: Subject to any disclaimer, the term of this patent is extended or adjusted under 35 U.S.C. 154(b) by 304 days.

(21) Appl. No.: 15/402,470

(22) Filed: Jan. 10, 2017

(65) Prior Publication Data

US 2017/0116976 A1    Apr. 27, 2017

Related U.S. Application Data

(63) Continuation-in-part of application No. PCT/CN2015/087350, filed on Aug. 18, 2015.

(60) Provisional application No. 62/070,274, filed on Aug. 20, 2014.

(51) Int. Cl.

| | |
|---|---|
| *G10K 11/172* | (2006.01) |
| *B32B 3/10* | (2006.01) |
| *F16F 9/30* | (2006.01) |
| *F16F 15/04* | (2006.01) |
| *B32B 27/08* | (2006.01) |
| *B32B 3/08* | (2006.01) |
| *G10K 11/162* | (2006.01) |
| *F16F 15/02* | (2006.01) |
| *G10K 11/168* | (2006.01) |
| *G10K 11/165* | (2006.01) |

(52) U.S. Cl.
CPC ............ *G10K 11/172* (2013.01); *B32B 3/085* (2013.01); *B32B 27/08* (2013.01); *G10K 11/162* (2013.01); *G10K 11/165* (2013.01); *G10K 11/168* (2013.01)

(58) Field of Classification Search
CPC .... G10K 11/172; G10K 11/165; B32B 3/085; B32B 3/10; B32B 3/08; F16F 9/306; F16F 15/02; F16F 15/022; F16F 15/04
See application file for complete search history.

(56) References Cited

U.S. PATENT DOCUMENTS 2,541,159 A * 2/1951 Geiger ...................... E04B 1/84
181/208
5,587,564 A * 12/1996 Stief .................... G10K 11/172
181/286

(Continued)

*Primary Examiner* — Edgardo San Martin
(74) *Attorney, Agent, or Firm* — Nath, Goldberg & Meyer; Jerald L. Meyer; Stanley N. Protigal

(57) ABSTRACT

A sound absorption panel (201) is constructed on an acoustically thin sheet (203) to provide an acoustic/vibrational energy absorption metamaterial structure. A plurality of dampers (101) are fixed to the acoustically thin sheet (203), and at least a subset of said dampers (101) comprise a support (103) and a flexible membrane (105) supported by the support. The flexible membrane (105) has one or more masses or platelets (107) attached. The dampers (101) in combination with the sheet (203) result in absorption of energy of movement of the sheet (203) resulting from sound transmission or vibrations across the sheet.

20 Claims, 2 Drawing Sheets

(56) References Cited

U.S. PATENT DOCUMENTS

| | | | | |
|---|---|---|---|---|
| 7,249,653 | B2* | 7/2007 | Sheng | E04B 1/86 |
| | | | | 181/207 |
| 7,395,898 | B2* | 7/2008 | Yang | G10K 11/172 |
| | | | | 181/286 |
| 8,579,073 | B2* | 11/2013 | Sheng | G10K 11/172 |
| | | | | 181/207 |
| 8,708,097 | B2* | 4/2014 | Borroni | B32B 3/266 |
| | | | | 181/286 |
| 8,752,667 | B2* | 6/2014 | McKnight | G10K 11/172 |
| | | | | 181/287 |
| 8,857,564 | B2* | 10/2014 | Ma | G10K 11/18 |
| | | | | 181/286 |
| 8,869,933 | B1* | 10/2014 | McKnight | G10K 11/172 |
| | | | | 181/207 |
| 8,960,365 | B2* | 2/2015 | Sheng | G10K 11/16 |
| | | | | 181/207 |
| 9,076,429 | B2* | 7/2015 | Islam | G10K 11/172 |
| 9,275,622 | B2* | 3/2016 | Claeys | G10K 11/172 |
| 9,711,129 | B2* | 7/2017 | Sheng | G10K 11/02 |
| 10,043,508 | B2* | 8/2018 | Park | G10K 11/02 |
| 2009/0223738 | A1* | 9/2009 | Nakamura | G10K 11/172 |
| | | | | 181/175 |
| 2011/0240402 | A1* | 10/2011 | Chou | F16F 7/104 |
| | | | | 181/207 |
| 2017/0132999 | A1* | 5/2017 | Coakley | G10K 11/172 |

\* cited by examiner

VIBRATION DAMPED SOUND SHIELD

RELATED APPLICATION(S)

This is a Bypass Continuation-In-Part of PCT/CN2015/087350, filed Aug. 18, 2015, an application claiming the benefit of Provisional Patent Application No. 62/070,274 filed Aug. 20, 2014, the content of each of which is hereby incorporated by reference in its entirety.

BACKGROUND

Field

The present disclosure relates to an energy absorption material, and in particular to absorb sound energy and to provide a shield or sound barrier and sound absorption system using substantially air-impermeable sheets.

Background

The attenuation of low frequency sound and vibration has been a challenging task because the dynamics of dissipative systems are generally governed by the rules of linear response, which dictate the frictional forces and fluxes to be both linearly proportional to rates. It follows that the dissipative power is quadratic in rates, thereby accounting for the inherently weak absorption of low frequency sound waves by homogeneous materials. To enhance the dissipation at low frequencies it is usually necessary to increase the energy density inside the relevant material, e.g., through resonance.

It is desired to provide a portable sound damper that takes advantage of the structure of metamaterials, and yet is easy to handle and deploy.

SUMMARY

A sound absorption panel comprising acoustic/vibrational energy absorption metamaterials is constructed on an acoustically thin sheet. A plurality of dampers are fixed to the acoustically thin sheet, and at least a subset of the dampers comprise a support and a flexible membrane. The flexible membrane has one or more masses or platelets attached. The dampers, in combination with the sheet, result in absorption of energy of movement of the sheet resulting from sound transmission or vibrations across the sheet.

In one configuration, vibrational motions of the structure comprise plural resonant modes with tunable resonant frequencies.

DETAILED DESCRIPTION

Overview

Figure 1:
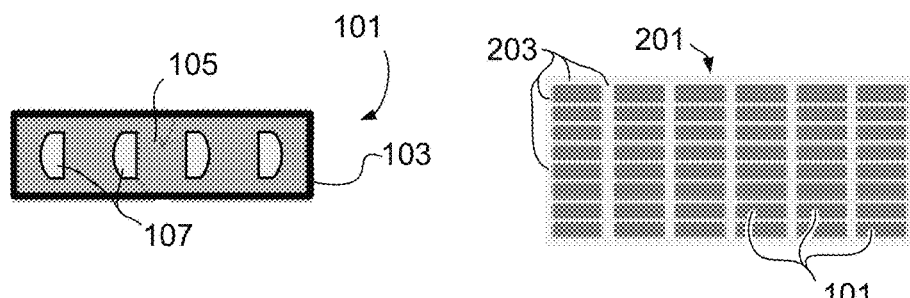
FIG. 1 is a diagram showing a damper comprising a group of platelets mounted on a membrane, in which the membrane is supported by a frame.

The term "metamaterials" denotes the coupling to the incident wave to be resonant in character. In an open system, radiation coupling to resonance is an alternative that can be effective in reducing dissipation. While the advent of acoustic metamaterials has broadened the realm of possible material characteristics, as yet there are no specific resonant structures targeting the efficient and sub-wavelength absorption of low frequency sound. In contrast, various electromagnetic metamaterials designed for absorption have been proposed, and an "optical black hole" has been realized by using metamaterials to guide the incident wave into a lossy core.

It has been found that by using thin elastic membranes decorated with or augmented with designed patterns of rigid platelets, the resulting acoustic metamaterials can absorb a significant portion of the acoustic waves at given frequencies, as well as at the higher frequency resonant modes. The structure is thus acoustically "dark", at least at particular frequencies. Finite-element simulations of the resonant mode patterns and frequencies are in excellent agreement with the experiments. In particular, laser Doppler measurements of resonant modes' displacement show discontinuities in its slope around platelets' perimeters, implying significantly enhanced curvature energy to be concentrated in these small volumes that are minimally coupled to the radiation modes; thereby giving rise to strong absorption similar to a cavity system, even though the system is geometrically open. When applied to a sound absorption system, anti-resonances do not play a significant role. This is because anti-resonances are essential in sound blocking, but are insignificant in sound absorption.

The reference to "thin" in "thin sheet" means an acoustically thin sheet in which the sheet is able to flex in accordance with sound waves or vibrations, which are transmitted across the sheet. Such sheets can have substantial thickness and yet be acoustically thin. As a result, sound absorption is achieved by the characteristics of a structure incorporating the thin sheet rather than as a result of the thickness of the sheet itself. In the case of the thin sheets described herein, the dampers, in combination with the sheet or membrane, provides the sound absorption in a manner which would not be achieved by the sheet or membrane alone. In addition to the "thin sheet" description, the described configuration used dampers which use a thin membrane. As is the case of the thin sheet, the membrane is able to flex in accordance with sound waves or vibrations. In addition, the membrane is able to allow movement of platelets mounted on the membrane.

In devices including thin elastic membranes augmented with rigid plates or platelets forming dampers, vibration energy can be highly concentrated on certain parts, such as the edges of the platelets, and dissipated to heat by the internal friction of the membranes. The devices can therefore effectively absorb the vibration energy passed onto it; i.e., acts like a vibration damper to elastic waves in solids. In both cases of airborne sound waves and elastic waves in solids, the vibration will excite the augmented membranes and the vibrational energy will be greatly dissipated by the devices. The working frequency range can be tailor-made by proper design of the devices so they can absorb the vibration from various sources under different situations. When such devices are attached to a solid host structure where damping of vibration is required, such as a beam, a plate (e.g., a car door or chassis), etc., vibration of the host structure is passed onto the frame, which can cause the resonances in the attached membrane devices, and dissipation of mechanical energy will occur. When they are installed in a chamber buried underground, for example, they can reduce the amplitude of the underground elastic waves that might be emitted from passing trains on the surface, or even seismic waves.

Existing technology for vibration protection of a building requires the building to be sitting on a vibration isolator having massive steel-reinforced rubber pads and/or damped springs. The design and construction of isolator and building must be done together. The presently disclosed devices can be embedded underground around the existing buildings without modifying the building's foundation. A blocking belt can be constructed around the train station, for example, for the abatement of the vibrations from moving trains.

The disclosed configuration uses an impermeable sheet in combination with dampers. Each of the dampers comprises at least one membrane mounted in a frame. The membranes in turn have vibration absorbing masses or platelets mounted to the membrane. These platelets, in combination with the membrane perform the vibration damping function of the dampers. When sound waves excite the sheet, the vibration is transferred to the dampers as a result of the dampers being attached to the sheet. The arrangement is such that the excitation of the sheet is absorbed by the dampers, and therefore the sheet is not able to transmit the sound. It is noted that, since the dampers are attached to or fixed to the sheet, the damping effect of the dampers is achieved by virtue of the attachment of the dampers to the sheets rather than by the dampers taken alone. Therefore, the full sound absorption is achieved by the combination of the sheet and the dampers.

The dampers are attached onto a relatively thin sheet to form an effective sound shield with large sound transmission loss. The sheet can either be quite rigid, or flexible impermeable cloth or plastic sheeting. A non-limiting example of a rigid sheet would be a ~1 mm thick hard plastic formed of polyvinyl chloride (PVC) polymer. Non-limiting example of a flexible cloth would be fabric material coated to be impermeable, or cloth, cloth reinforced or non-cloth tarpaulin material. Non-limiting examples of plastic sheeting would be plastic sheeting used for shower curtains or wallpaper, or plastic sheeting used for construction as either permanent or temporary covering material.

In one non-limiting configuration, the sheet has near zero air permeability, as sound transmission loss of the shield goes down with the increase of the permeability. Nevertheless, it is possible to have some permeability and still have the sound absorbing sheet function.

The working principle of the shield relies on the coupling of the impermeable sheet and the fact that, in order for sound to cross the sheet, the sheet must also vibrate. When sound waves are incident onto an air-impermeable sheet, they excite the vibration of the sheet, which then serves as the secondary sound source and emits sound waves to both sides of the sheet. When the dampers are attached to the sheet, large amounts of vibration energy in the sheet is absorbed by the dampers, so the emitted sound waves both on the incident side which contributes to the reflected sound waves, and on the back side which is the sole source of the transmitted waves, are much reduced. This effect is largely independent of the sheet being relatively rigid or highly flexible like a piece of cloth. Being relatively rigid, the rigid sheet with dampers will certainly have higher sound transmission loss than the flexible one.

In many applications, sound shields that can be rolled up for transport and rolled out like curtains to shield the noise sources have distinct advantage over inflexible sound shield in the form of large plates. For example, portable tents can be made with flexible shields that are much easier to transport, assemble, and disassemble, which can be used to cover the noise source in road/railway repairs, especially at night.

EXAMPLES

FIG. 1 is a diagram showing a damper 101 used in an example configuration of the described technology. Damper 101 comprises frame support or frame 103, membrane 105 and masses or platelets 107. Membrane 105 is mounted on frame 103, and platelets 107 are fixed on membrane 105. Platelets 107 are similar to the platelets or weights described in US Published Patent Application No. 2014/0060962, issued as U.S. Pat. No. 8,960,365, and incorporated by reference. In the present configuration, the platelets 107 are specifically used as part of dampers 101 which, in turn, are used as sound absorption elements. In a non-limiting example, the thickness of membrane 105 is less than 1 mm, and membrane 105 can be air permeable.

Platelets 107 may be fixed to the membrane or may be hinged to membrane 105. In one non-limiting example, platelets 107 are purposely made to be asymmetrical so as to induce a "flapping" motion as described in Patent Application No. 2014/0060962. The platelets can be replaced with any other rigid or semi-rigid plates with asymmetric shapes.

An explanation of the strong absorption can be found by considering the bending wave (or flexural wave) of a thin solid elastic membrane satisfying the biharmonic equation:

$$\nabla^4 w - (\rho h/D)\omega^2 w = 0,$$

where $D=Eh^3/12(1-v^2)$ is the flexural rigidity and h the thickness of the membrane.

The corresponding elastic curvature energy per unit area is given by:

$$\Omega = \frac{1}{2}D\left[\left(\frac{\partial^2 w}{\partial x^2}\right)^2 + \left(\frac{\partial^2 w}{\partial y^2}\right)^2 + 2v\frac{\partial^2 w}{\partial x^2}\frac{\partial^2 w}{\partial y^2} + 2(1-v)\left(\frac{\partial^2 w}{\partial x \partial y}\right)^2\right]. \quad (1)$$

As $\Omega$ is a function of the second-order spatial derivatives of w, when the first-order derivative of w is discontinuous across the edge boundary, it is easy to infer that the areal energy density $\Omega$ should have a very large value within the perimeter region (divergent in the limit of a thin shell). Moreover, as the second derivative is quadratic, the integrated value of the total potential energy must also be very large. In the limit of small h, the vibration modes of the system may be regarded as a weak-form solution of the shell model, in the sense that while the biharmonic equation is not satisfied at the perimeter of the platelets (since the higher-order derivatives do not exist), yet besides this set of points with measure zero the solution is still a minimum case of the relevant Lagrangian.

In a conventional open system, high energy density is equally likely to be radiated, via transmitted and reflected waves, as to be absorbed. It is noted that in the present case, the small volumes in which the elastic energy is concentrated may be regarded as an "open cavity" in which the lateral confinement in the plane of the membrane is supplemented by the confinement in the normal direction, owing to the fact that the relative motion between the platelets and the membrane contributes only minimally to the average normal displacement of the membrane. From the dispersion relation $k_\parallel^2 + k_\perp^2 = k_o^2 = (2\pi/\lambda)^2$ for the waves in air, the subscripts ($\parallel$) and ($\perp$) denote the component of the wave vector being parallel or perpendicular to the membrane plane. Hence from the dispersion relation $k_\parallel^2 + k_\perp^2 = k_o^2 = (2\pi/\lambda)^2$, it can be seen that the relative motions between the platelets and the membrane, which must be on a scale smaller than the sample size $d \ll \lambda$, can only couple to the evanescent waves since the relevant $k_∥^2 \gg k_o^2$. Only the average normal displacement of the membrane, corresponding to the piston-like motion, would have $k_∥$ components that are peaked at zero and hence can radiate. The high energy density regions, owing to their small lateral dimensions, contribute minimally to the average component of the normal displacement.

In accordance with the Poynting's theorem for elastic waves, the dissipated power within the membrane can be calculated as:

$$Q = 2\omega^2 (\chi_o/E) \int U dV. \quad (2)$$

Absorption is defined as Q/(P·S), where $P=p^2/(\rho c)$ denotes the Poynting's vector for the incident acoustic wave and S is membrane's area, with p being the pressure amplitude.

Figure 2:
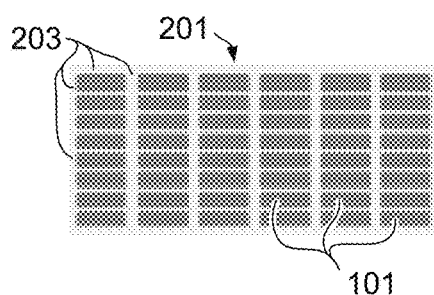
FIG. 2 is a diagram showing a damped sound shield, having an array of dampers mounted on a sheet.

FIG. 2 is a diagram showing a damped sound shield 201. Damped sound shield 201 comprises sheet 203, having an array of dampers 101 fixed on the sheet. Dampers 101, when moved by sheet 203 absorb energy. By way of non-limiting example, the dampers 101 are fixed to the sheet 203 by adhesive at their frames 103 (FIG. 1); however, other means of attachment, such as rivets or expanding material can be used.

In one non-limiting example, plastic sheet 203 was cut from a new shower curtain. Plastic sheet 203 can either be quite rigid or flexible. A non-limiting example of a rigid sheet would be a ~1 mm thick hard plastic, such as polyvinyl chloride (PVC) polymer, although other plastics and other materials such as sheet metal and metal foil can be used. A non-limiting example of a flexible sheet would be plastic sheets of the type used for shower curtains or wallpaper. While the thickness was not precisely measured, typical sheets of this type are PVC or polyethylene vinyl acetate (PEVA), polyvinyl acetate (PVA), and polyvinyl butyral (PVB) polymer plastics, at thicknesses of 0.04 mm, 0.05 mm, 0.08 mm, 0.10 mm, and 0.15 mm.

The coupling of dampers 101 to sheet 203 and the coupling of platelets 107 on dampers 101 to sheet 203 can be described by a combination of Young's modulus and the Poisson ratio of the structure. This coupling is in part achieved through the materials of membrane 105 and sheet 203, and in part through the compressivity of air entrained between membrane 105 and sheet 203.

Referring back to FIG. 1 as well as FIG. 2, while a separate frame support or frame 103 is described, it is also possible to integrate the frame structurally with membrane by bonding the membrane to a supporting structure such as sheet 203. In this configuration, the membrane may be positioned away from the sheet except where attached or may be flush with the sheet. In the case of the membrane being positioned away from the sheet, this may be accomplished by the material of the sheet or membrane being bowed away, or may be accomplished by the use of air sealed within a cavity formed between the sheet and membrane.

Platelets 107 may be substantially similar, or may have different masses within each damper 101. Additionally, different dampers 101 used in a single sheet 203 may have platelets 107 whose masses differ from the masses of platelets 107 in other dampers 101 on the same sheet 203.

Figure 3:
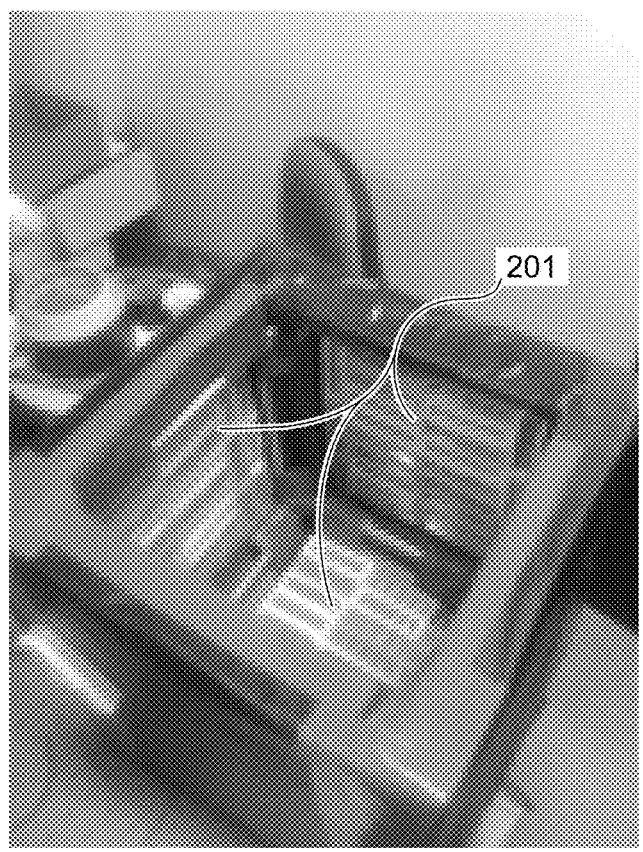
FIG. 3 is a diagram showing a sound-absorbing cage constructed using multiple damped sound shields of FIG. 2.

FIG. 3 is a diagram showing a sample sound-absorbing cage 300 constructed using multiple damped sound shields 201 of FIG. 2. The structure was configured as a cubic cage with an open top. The cage about 30 cm and 25 dB per side, and was constructed with twelve metal rods as a frame and five damped sound shields 201 to cover the five surfaces, leaving one surface open as the open top. The areal mass density of the shield is about 2.5 kg/m². A thick epoxy glass plate was mounted on an optical table, and a loudspeaker (not shown) was installed on the glass plate. The sound transmission loss of the cage was then measured by measuring the sound waves above the loud speaker with and without the cage covering the loud speaker. As another example, a cubic box (80 cm in side length) with wood panels was made and tested in the same way as in example-1 shown in FIG. 3. The A-weight transmission loss of the bare wood box is 20 dB. With the dampers covering the panels, the A-weight transmission loss of the box increased to 35 dB.

Figure 4:
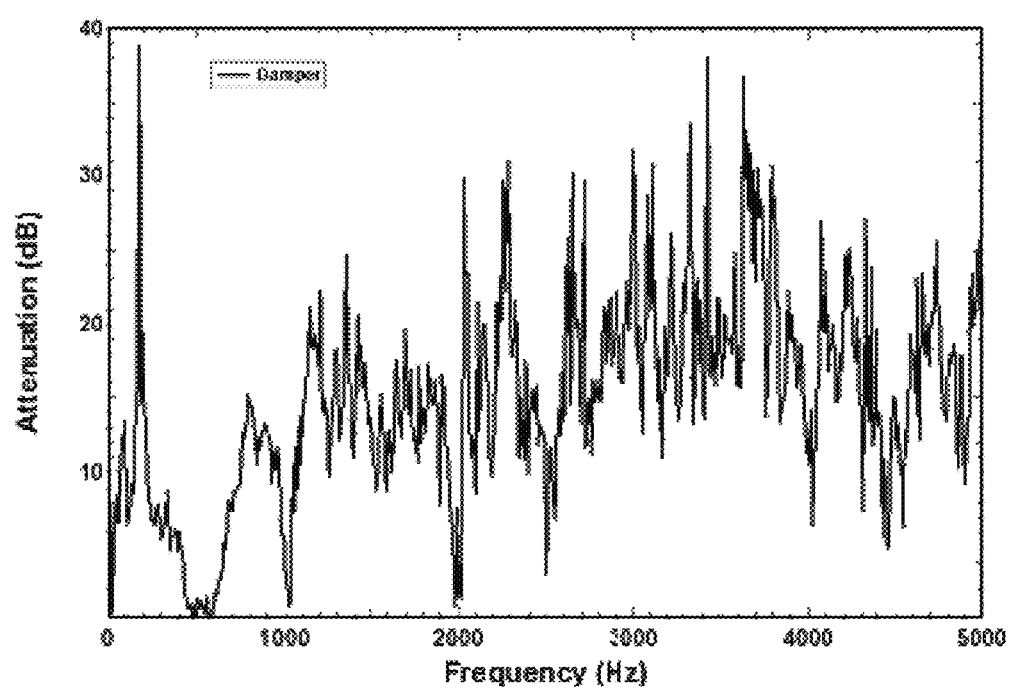
FIG. 4 is a graphical depiction showing sound transmission loss as a function of frequency for the cage depicted in FIG. 3.

FIG. 4 is a graphical depiction showing sound transmission loss as a function of frequency for the cage of FIG. 3. The graph depicted in FIG. 4 shows A-weighted measurements, defined in the International standard IEC 61672: 2003. The cage rendered an A-weighted average sound transmission loss of over 35 dB.

For comparison, a reference cage (not shown) of the same dimensions as cage 300 with surfaces covered by similar plastic sheets, but substituting steel plates for dampers 101 was constructed. The sheets on the reference cage were evenly and densely covered with steel plates about 5 cm in diameter and 2 mm thick was also tested in the same way as the cage with the damped sound shields. The areal mass density of the reference cage is about 10 kg/m², or 4 times that of the damped one. The A-weighted average sound transmission loss is slightly below 20 dB. It could be seen that the superior sound transmission loss of damped sound shields 201 is not simply due to the mass density law, but due to the efficient vibration damping capability of dampers 101.

Conclusion

It will be understood that many additional changes in the details, materials, steps and arrangement of parts, which have been herein described and illustrated to explain the nature of the subject matter, may be made by those skilled in the art within the principle and scope of the invention as expressed in the appended claims.

What is claimed is:

1. An acoustic/vibrational energy absorption metamaterial comprising:
   a substantially air impermeable flexible sheet (203); and
   a plurality of dampers (101) fixed to the flexible sheet, at least a subset of the dampers comprising:
   an enclosed planar frame (103);
   an flexible, membrane (105) attached to said frame; and
   at least one rigid or semi-rigid mass or platelet (107) having an asymmetrical shape when taken in a plan view facing the thin sheet and fixedly attached to said flexible membrane by an asymmetrical hinge attachment so as to induce a flapping motion about the hinge attachment, the masses or platelets providing a restoring force exerting by the flexible membrane upon displacement of the dampers on the sheet, wherein at least a subset of the dampers present plural resonant modes with tunable resonant frequencies.

2. A sound absorption panel comprising:
   the acoustic/vibrational energy absorption metamaterial of claim 1, wherein the dampers in combination with the sheet result in absorption of energy of movement of the sheet resulting from sound transmission or vibrations across the sheet, and wherein the dampers provide a tunable function by varying at least one of the Young's modulus and the Poisson ratio of the flexible membrane.

3. The acoustic/vibrational energy absorption metamaterial of claim 1, further comprising:
the subset of said dampers arranged in a substantially regular pattern.

4. A sound absorption panel comprising:
the acoustic/vibrational energy absorption metamaterial of claim 1, wherein the dampers in combination with the sheet result in absorption of energy of movement of the sheet resulting from sound transmission or vibrations across the sheet,
wherein the dampers provide a tunable function by varying at least one of the Young's modulus and the Poisson ratio of the flexible membrane,
and wherein the masses or platelets provide a tunable function based on tunable resonant frequencies, said resonant frequencies tunable by varying the distance of separation between asymmetric plates, or the thickness and elasticity of the membrane, the mass of the plates, and the damper dimensions.

5. The acoustic/vibrational energy absorption metamaterial of claim 1,
wherein the dampers comprise masses subject to vibratory motion and the vibratory motion has resonant frequencies that increases or decreases by varying the lateral dimensions of the flexible membrane, elasticity of the flexible membrane, a distance of separation between adjacent ones of the masses, and the material type and dimension of the damper bodies, thereby permitting selection of the resonant frequency as a lossy core,
wherein the dampers provide a tunable function by varying at least one of the Young's modulus and the Poisson ratio of the flexible membrane,
and wherein the masses or platelets provide a tunable function based on tunable resonant frequencies, said resonant frequencies tunable by varying the distance of separation between asymmetric plates, or the thickness and elasticity of the membrane, the mass of the plates, and the damper dimensions.

6. The acoustic/vibrational energy absorption metamaterial of claim 1, wherein at least a plurality of the masses have a rigid attachment to the flexible membrane.

7. The acoustic/vibrational energy absorption metamaterial of claim 1, wherein at least a plurality of the masses have a hinged attachment to the flexible membrane.

8. The acoustic/vibrational energy absorption metamaterial of claim 1, wherein the dampers have a rigid adhesive attachment to the sheet.

9. The acoustic/vibrational energy absorption metamaterial of claim 1, further comprising:
the sheet formed with dampers having different weights from other said dampers on the sheet.

10. A method of attenuating sound or vibrations, the method comprising:
providing a substantially air impermeable acoustically thin sheet; and
providing a plurality of dampers fixed to the acoustically thin sheet, wherein at least a subset of said dampers each comprise a support and a flexible membrane supported by the support and have a plurality rigid or semi-rigid of masses or platelets having an asymmetrical shape when taken in a plan view facing the thin sheet and fixedly attached thereto by an asymmetrical hinge attachment so as to induce a flapping motion about the hinge attachment, wherein the dampers in combination with the sheet absorb energy of movement of the sheet resulting from sound transmission or vibrations across the sheet.

11. The method of claim 10, wherein the masses or platelets provide a tunable function based on tunable resonant frequencies, said resonant frequencies tunable by varying the distance of separation between asymmetric plates, or the thickness and elasticity of the membrane, the mass of the plates, and the damper dimensions.

12. The method of claim 10,
wherein the dampers comprise masses subject to vibratory motion and the vibratory motion has resonant frequencies that increases or decreases by varying the lateral dimensions of the flexible membrane, elasticity of the flexible membrane, a distance of separation between adjacent ones of the masses, and the material type and dimension of the damper bodies, thereby permitting selection of the resonant frequency as a lossy core,
wherein the dampers provide a tunable function by varying at least one of the Young's modulus and the Poisson ratio of the flexible membrane,
and wherein the masses or platelets provide a tunable function based on tunable resonant frequencies, said resonant frequencies tunable by varying the distance of separation between asymmetric plates, or the thickness and elasticity of the membrane, the mass of the plates, and the damper dimensions.

13. The method claim 10, further comprising:
providing the subset of said dampers in a substantially regular pattern.

14. The method of claim 10, further comprising:
providing at least a plurality of the dampers rigidly attached to the acoustically thin sheet.

15. The method claim 10, further comprising:
providing the plurality of dampers fixed to the acoustically thin sheet so that at least a plurality of the masses have a hinged attachment to the flexible membrane.

16. The method claim 10, further comprising:
providing at least a plurality of the dampers with a rigid adhesive attachment to the sheet.

17. The method claim 10, further comprising:
providing the sheet formed with dampers having different weights from other said dampers on the sheet.

18. The acoustic/vibrational energy absorption metamaterial of claim 1,
wherein sound transmission or vibrations incident onto an air-impermeable sheet excite vibration of the sheet and causes the sheet to emit sound waves or vibrations to both sides of the sheet, with the dampers absorbing the sound waves or vibrations,
and wherein the absorbing the sound waves or vibrations increase transmission loss.

19. The sound absorption panel of claim 2, further comprising:
the flexible sheet allowing rolling up the sound shields for transport, and rolling out the sound shields to shield the noise sources to provide for easy transport of the sound shields.

20. The method of claim 10,
wherein sound transmission or vibrations incident onto an air-impermeable sheet excite vibration of the sheet and causes the sheet to emit sound waves or vibrations to both sides of the sheet, with the dampers absorbing the sound waves or vibrations, and wherein the absorbing the sound waves or vibrations increase transmission loss.

\* \* \* \* \*